United States Patent [19]

Akagi et al.

[11] Patent Number: 5,709,916
[45] Date of Patent: Jan. 20, 1998

[54] POLYBUTYLENE TEREPHTHALATE HAVING LOW CARBOXYL GROUP CONCENTRATION AND LOOSE TUBE FOR OPTICAL FIBER COMPRISING THE SAME

[75] Inventors: Noriyuki Akagi, Osaka; Hiroki Nagano; Masami Umeda, both of Matsuyama; Naonobu Tadokoro, Chiba-ken; Kazumoto Miyajima, Matsuyama, all of Japan

[73] Assignee: Teijin Limited, Osaka, Japan

[21] Appl. No.: 688,290

[22] Filed: Jul. 29, 1996

[30] Foreign Application Priority Data

Jul. 27, 1995 [JP] Japan .................................. 7-191773

[51] Int. Cl.[6] ........................................... B32B 1/08
[52] U.S. Cl. .................. 428/35.7; 528/272; 528/275; 528/288; 528/480; 528/503; 428/35.7
[58] Field of Search ..................... 528/272, 275, 528/288, 480, 503; 428/35.7

[56] References Cited

U.S. PATENT DOCUMENTS 4,196,279   4/1980   Azuma et al. ........................ 528/275

FOREIGN PATENT DOCUMENTS

| 57-2728 | 1/1908 | Japan . |
| 49-16794 | 2/1974 | Japan . |
| 57-147516 | 9/1982 | Japan . |
| 1 402 071 | 3/1972 | United Kingdom . |

Primary Examiner—Samuel A. Acquah
Attorney, Agent, or Firm—Wenderoth, Lind & Ponack

[57] ABSTRACT

A loose tube for an optical fiber comprising a polybutylene terephthalate. The polybutylene terephthalate has a terminal carboxyl group concentration of 10 eq./$10^6$ g·polymer or less and an intrinsic viscosity [η], measured at 25° C. in orthochlorophenol, of 0.9 to 1.4 dl/g.

10 Claims, No Drawings

POLYBUTYLENE TEREPHTHALATE HAVING LOW CARBOXYL GROUP CONCENTRATION AND LOOSE TUBE FOR OPTICAL FIBER COMPRISING THE SAME

DETAILED DESCRIPTION OF THE INVENTION

This invention relates to a polybutylene terephthalate having a low carboxyl group concentration and to a loose tube for an optical tube comprising the same. More specifically, it relates to a polybutylene terephthalate having a low carboxyl group concentration and viscosity suitable for melt molding and a loose tube for an optical fiber comprising the polybutylene terephthalate.

JP-A 49-16794 (the term "JP-A" as used herein means an "unexamined published Japanese patent application") discloses a method for solid-phase polycondensing a polybutylene terephthalate, which comprises the steps of pulverizing a molten material obtained by cooling an intermediate condensate of a polybutylene terephthalate, and heating the resulting particles to a temperature lower than the melting point by 5° to 60° C. of the intermediate condensate without drying or crystallizing the particles. In Examples of this prior art, polymers having an intrinsic viscosity, measured at 30° C. in a mixture containing the same amounts of phenol and tetrachloroethane, of 1.58 to 1.82 dl/g were obtained. However, the publication is totally silent about a carboxyl group.

Japanese Patent Publication No. JRB 57-2728 discloses a method for producing a polybutylene terephthalate having a high degree of polymerization, which comprises the steps of providing a crystallinity of 46% or more to a polybutylene terephthalate and then subjecting it to a solid-phase polymerization. Examples of the publication disclose a polybutylene terephthalate having an intrinsic viscosity, measured at 25° C. in o-chlorophenol, of 1.63 to 1.71 dl/g and a carboxyl group concentration of 13.9 to 22.4 eq./$10^6$ g.

JP-A 57-147516 discloses a method for producing a polyester comprising an aromatic dicarboxylic acid as a main acid component and 1,4-butanediol as a main glycol component through a melt polymerization reaction, which comprises the step of adding an alkaline metal compound to a reaction system before the completion of the melt polymerization reaction. In Example of this publication, a polybutylene terephthalate having a carboxyl group concentration of 10.0 eq./$10^6$ g and an intrinsic viscosity, measured at 25° C. in orthochlorophenol, of 0.91 dl/g is disclosed as a polybutyene terephthalate having the lowest carboxyl group concentration. There is no disclosure in other Examples of the publication of a polybutylene terephthalate having an intrinsic viscosity of more than 0.91 dl/g.

Meanwhile, Hüls Aktiengesellschaft has developed a polybutylene terephthalate suitable for use in a loose tube which has already been available on the market under the trade name of VESTODUR 3000, 3001 and 3030.

Although a polybutyene terephthalate is excellent in chemical resistance, heat resistance and mechanical properties, it is unsatisfactory in resistance to hydrolysis. Therefore, when it is used in a high-temperature high-humidity atmosphere, it encounters in durability in some cases.

An optical cable and a steam pipe are sometimes arranged together in an underground multipurpose duct. When steam leakage occurs in such an underground multipurpose duct owing to some trouble, the hydrolysis of a loose tube made from the polybutylene terephthalate causes trouble in some cases.

It is therefore an object of the present invention to provide a polybutylene terephthalate having a low terminal carboxyl group concentration, excellent resistance to hydrolysis and an appropriate degree of polymerization suitable for melt molding.

It is another object of the present invention to provide a polybutylene terephthalate having excellent resistance to hydrolysis and toughness at low temperatures.

It is a further object of the present invention to provide a loose tube for an optical fiber, which comprises the above polybutylene terephthalate of the present invention.

Other objects of the present invention will become apparent from the following description.

According to present invention, the above objects and advantages of the present invention are attained by a polybutylene terephthalate which has a terminal carboxyl group concentration of 10 eq./$10^6$ g·polymer or less and an intrinsic viscosity [η], measured at 25° C. in orthochlorophenol, of 0.9 to 1.4 dl/g.

In the present invention, a polybutylene terephthalate (may be referred to as "PBT" hereinafter) denotes a polyester which contains terephthalic acid in an amount of at least 80 mol %, preferably at least 90 mol %, of the whole dicarboxylic acid component and 1,4-butanediol in an amount of at least 80 mol %, preferably at least 90 mol %, of the whole glycol component.

Dicarboxylic acids other than terephthalic acid include aromatic dicarboxylic acids such as isophthalic acid, napthalenedicarboxylic acid, diphenyldicarboxylic acid, diphenyletherdicarboxylic acid, diphenoxyethanedicarboxylic acid, diphenylketonedicarboxylic acid and diphenylsulfonedicarboxylic acid; aliphatic dicarboxylic acids such as succinic acid, adipic acid and sebacic acid; and alicyclic dicarboxylic acids such as cyclohexanedicarboxylic acid, tetralindicarboxylic acid and decalindicarboxylic acid.

Diols other than 1,4-butanediol include ethylene glycol, hexamethylene glycol, neopentyl glycol, cyclohexane dimethanol, tricyclodecane dimethylol, xylylene glycol, bisphenol A, bisphenol B, bishydroxyethoxy bisphenol A and the like.

A polyfunctional compound having multi-functional group such as trifunctional group, e.g., such as glycerin, trimethylol propane, pentaerythritol, trimellitic acid, trimesic acid, pyromellitic acid or the like may be copolymerized with the polyester in an amount that the polyester does not substantially lose its melt moldability.

The polybutylene terephthalate of the present invention has a terminal carboxyl group concentration of 10 eq./$10^6$ g·polymer or less, preferably 8 eq./$10^6$ g·polymer or less, more preferably 5 eq./$10^6$ g·polymer or less. If the terminal carboxyl group concentration is more than 10 eq./$10^6$ g·polymer, resistance to hydrolysis which is aimed at by the present invention cannot be obtained.

The polybutylene terephthalate of the present invention has an intrinsic viscosity [η], measured at 25° C. in orthochlorophenol, of 0.9 to 1.4 dl/g, preferably 1.1 to 1.2 dl/g, while the intrinsic viscosity is less than 0.9 dl/g, toughness at low temperatures will be insufficient and if the intrinsic viscosity is more than 1.4, sufficient melt moldability cannot be obtained.

The polybutylene terephthalate of the present invention may contain an ionic alkali metal or a nitrogen atom. It is made easy to control the terminal carboxyl group concentration to 10 eq./$10^6$ g·polymer or less when an ionic alkali metal or a nitrogen atom is contained in the polybutylene terephthalate. The ionic alkali metal and the nitrogen atom are derived from a compound to be added during a melt polycondensation reaction for producing a polybutylene terephthalate as will be described hereinafter.

The polybutylene terephthalate of the present invention retains excellent mechanical properties such as tensile strength after a wet-heat treatment and has the property of being hardly brittle at low temperatures.

In other words, the polybutylene terephthalate of the present invention can exhibit a tensile strength of at least 40 MPa, preferably at least 45 MPa, as an ASTM No.1 test sample after it is treated at 122° C. in a 100% relative humidity atmosphere for 60 hours.

Further, the polybutylene terephthalate of the present invention exhibits low-temperature brittleness at a temperature lower than −30° C., preferably −35° C., in a low-temperature brittleness test based on JIS K7216.

To the polybutylene terephthalate of the present invention may be added, for example, a pigment used in fibers, films, resins and the like, such as titanium oxide or carbon black, an ultraviolet light absorber such as a benzophenone-based compound, benzene triazole compound or salicyclic compound, a lubricant, a release agent, a crystal nucleating agent, a crystallization promoting agent, a flame retardant, a flame retardant aid and the like.

The polybutylene terephthalate of the present invention can be advantageously produced by a solid-phase polymerization.

Before the solid-phase polymerization is carried out, the polybutylene terephthalate of the present invention is heated to increase its crystallinity.

Preferably, this prior heating treatment is carried out under agitation at a stirring rate of 1 revolution or more per minute.

Preferably, the temperature of the solid-phase polymerization is higher than the temperature of the prior heating treatment.

The polybutylene terephthalate to be subjected to the solid-phase polymerization may be produced, for example, by an ester exchange process, direct polymerization process or the like. In either case, polymerization may be carried out in either continuous or batch manner. When polymerization is preferably carried out in a continuous manner, a polybutylene terephthalate having a relatively low terminal carboxyl group concentration can be preferably obtained.

Polymerization in a continuous manner is suitably carried out as follows.

Dimethyl terephthalate and 1,4-butanediol in a molar ratio of 1.1 to 2.0 are subjected to an ester exchange reaction in a continuous reactor equipped with a rectification column at 150° to 200° C. in the presence of a tetrabutoxide trititanate catalyst until 75 to 98% of methyl ester groups is reacted. In the subsequent step, a polybutylene terephthalate is polymerized using at least one thin film polymerization reactor at a temperature of 200° to 250° C. and at a vacuum degree of 300 to 0.1 Torr. Any known thin film polymerization reactor can be used.

When polymerization is carried out a batch manner, a polybutylene terephthalate having a relatively high terminal carboxyl group concentration is readily obtained. Therefore, an alkali metal compound, ammonium compound or amine compound is preferably added during the melt polymerization reaction to reduce the carboxyl group concentration in this case.

Preferred examples of the alkali metal compound include salts and hydroxides of elements of the group Ia of the Periodic Table and combinations thereof. Specific examples of the compound include inorganic acid salts such as lithium carbonate, sodium carbonate and potassium carbonate; and organic carboxylic acid salts such as lithium acetate, sodium acetate, potassium acetate, lithium benzoate, sodium benzoate and potassium benzoate.

The ammonium compound is a compound represented by the following formula (1):

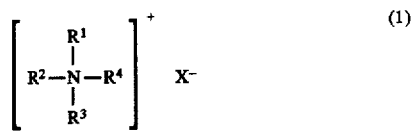

wherein $R^1$, $R^2$, $R^3$ and $R^4$ may be the same or different and selected from the group consisting of a hydrogen atom, alkyl group, aryl group, cycloalkyl group and arylalkyl group, and X is OH, halogen or residual organic acid group.

Illustrative examples of the ammonium compound include tetraethyl ammonium terephthalate, tetraethyl ammonium hydroxide, tetraethyl ammonium chloride and aqueous ammonia ($NH_4OH$).

The amine compound is a compound represented by the following formula (2):

wherein $R^5$, $R^6$ and $R^7$ may be the same or different and selected from the group consisting of a hydrogen atom, alkyl group, aryl group, cycloalkyl group and arylalkyl group.

Illustrative examples of the amine compound include methylamine, ethylamine, propylamine, butylamine, amylamine, hexylamine, heptylamine, octylamine, nonylamine, decylamine, undecylamine, dodecylamine, tridecylamine, tetradecylamine, pentadecylamine, cecylamine, arylamine, cyclopropylamine, cyclobutylamine, cyclpentylamine, cyclohexylamine, aniline, m-toluidine, p-toluidine, o-toluidine, benzylamine, α-naphthylamine, β-naphthylamine, ammonia, dimethylamine, diethylamine, diisopropylamine, dibutylamine, diamylamine, diarylamine, methylaniline, ethylaniline, dibenzylamine, diphenylamine, trimethylamine, triethylamine, tripropylamine, tributylamine, triamylamine, triarylamine, dimethylaniline, diethylaniline, tribenzylamine and triphenylamine.

Among the above compounds, alkali metal compounds are preferred, and sodium compounds and potassium compounds are more preferred.

The alkali metal compound or the above nitrogen-containing compound is added to ensure that the amount of an alkali metal or nitrogen atom is preferably 1 to 5,000 ppm, more preferably 5 to 1,000 ppm, particularly preferably 15 to 100 ppm based on the polybutylene terephthalate produced.

If the content of one of the above compounds is too small, the satisfactory effect of reducing the terminal carboxyl group concentration can hardly be obtained, and if the content is too large, the resulting polyester may be colored or a side effect is developed at the time of compounding disadvantageously.

The thus obtained polybutylene terephthalate to be subjected to the solid-phase polymerization preferably has an intrinsic viscosity of 0.4 to 1.0 dl/g.

Prior to the solid-phase polymerization, the polybutylene terephthalate is subjected to a heat treatment for crystallization as described above.

The heat treatment is preferably carried out until a polybutylene terephthalate has a crystallinity of at least 49% in the case where it contains an alkali metal compound or the like as described above or until a polybutylene terephthalate has a crystallinity of at least 46% in the case where it does not contain an alkali metal compound or nitrogen-containing compound.

The polybutylene terephthalate of the present invention is suitably used as a loose tube for an optical fiber.

Therefore, according to the present invention, there is provided a loose tube for an optical fiber which comprises the polybutylene terephthalate of the present invention, that is, a loose tube for an optical fiber which comprises a polybutylene terephthalate having a terminal carboxyl group concentration of 10 eq./$10^6$ g·polymer or less and an intrinsic viscosity [η], measured at 25° C. in orthochlorophenol, of 0.9 to 1.4 dl/g.

The loose tube is a tube for holding a bundle or a plurality of bundles of glass fibers loosely therein. The tube is normally filled with a water-repellant jelly compound for protecting the glass fibers from external force.

The polybutylene terephthalate constituting the loose tube of the present invention may contain an ionic alkali metal or a nitrogen atom in an amount of 0 to 5,000 ppm and is preferably produced by a solid-phase polymerization.

The polybutylene terephthalate exhibits a tensile strength of at least 40 MPa, preferably at least 45 MPa as an ASTM No. 1 test sample after 60 hours of a treatment at 122° C. in a 100% relative humidity atmosphere.

The polybutylene terephthalate preferably exhibits a low brittle temperature lower than −30° C., more preferably −35° C., in a low-temperature brittleness test based on JIS K 7216.

The following Examples are given to further illustrate the present invention.

In the examples, "parts" means "parts by weight". The intrinsic viscosity [η] of the polymer is a value calculated from a solution viscosity measured at 25° C. in orthochlorophenol.

The concentration of a terminal carboxyl group (COOH) is an equivalent weight per $10^6$ g of a polymer measured in accordance with an A. Conix method (Makromol. Chem. 26, 226 (1958)).

The crystallinity of a polymer is calculated from the following equation by a density method.

$$\text{crystallinity} = \frac{\rho c (\rho - \rho a)}{\rho (\rho c - \rho a)} \times 100$$

In the above equation, ρa=1.259, ρc=1.396 and ρ is a density of a sample.

The fusion bonding rate of a polymer is expressed in % by weight, based on the total weight of 5 kg of screened chips, of two or more particles of the chips that are fusion bonded to each other.

The uniformity of quality is expressed by a standard deviation σ of [η] of 10 samplings from a polymer obtained through a solid-phase polymerization.

EXAMPLES 1 and 2, COMPARATIVE EXAMPLES 1 TO 3 AND REFERENCE EXAMPLE 1

3,500 parts of dimethyl terephthalate, 2,560 parts of butanediol and 26 parts of tetrabutoxide titanate were charged into a reactor and an ester exchange reaction was carried out at 170° C. At the time when theoretically 85% of methanol distilled out, the temperature was elevated to 200° C., a predetermined amount of potassium acetate shown in Table 1 was added, the temperature inside the reactor was elevated to 240° C. while the pressure of the system was reduced to a weak vacuum level (≈30 mmHg) 10 minutes after the addition, and the pressure was maintained at a weak vacuum level while air was sucked for 30 minutes, and then the system is reduced to 1 mmHg or less to carry out a reaction at 242° C.

The resulting polybutylene terephthalate was formed into a chip. This chip was placed in a complete mixing type crystallization tank equipped with a stirrer, crystallized under predetermined conditions and supplied into a packing column to carry out solid-polymerization under predetermined conditions.

The quality of the thus obtained polymer is shown in Table 1.

TABLE 1

| | Alkali metal compound | | Prepolymer | | Crystallization conditions | | Solid-phase polymerization conditions | | polymer obtained by solid-phase polymerization | | | |
|---|---|---|---|---|---|---|---|---|---|---|---|---|
| | Compound | Amount (ppm) | [η] (dl/g) | COOH (eq/Ton) | Agitation | Temperature (°C.) | Crystallinity (%) | Temperature (°C.) | Time (hr) | Fusion bonding rate (%) | [η] (dl/g) | σ of [η] | COOH (eq/Ton) |
| Referetial Example 1 | — | — | 0.70 | 50 | Done | 187 | 48.5 | 190 | 4.5 | 0 | 0.91 | 0.01 | 45 |
| Example 1 | Potassium acetate | 18 | 0.56 | 13 | Done | 195 | 50.2 | 189 | 23.2 | 0 | 1.12 | 0.01 | 2 |
| Example 2 | Potassium acetate | 18 | 0.56 | 13 | Done | 187 | 49.5 | 185 | 39.9 | 0 | 1.10 | 0.01 | 3 |
| Comparative Example 1 | Potassium acetate | 18 | 0.56 | 13 | Not done | 195 | 50.3 | — | — | 50 | — | — | — |
| Comparative Example 2 | Potassium acetate | 18 | 0.56 | 13 | Done | 187 | 49.5 | 190 | 31.2 | 10 | 1.12 | 0.03 | 3 |
| Comparative Example 3 | Potassium acetate | 18 | 0.56 | 13 | Done | 185 | 47.5 | 185 | 42.9 | 5 | 1.12 | 0.03 | 4 |

In this instance, in the case of normal PBT containing no alkali metal compound, even when crystallinity is less than 49% or even when a solid-phase polymerization is carried out at a temperature higher than crystallization temperature, no problem occurs. (to be referred to as Referential Example 1)

However, in the case of PBT containing an alkali metal compound, it is found that fusion bonding occurs or there is a great variability in quality when the all conditions of the present invention are not satisfied.

EXAMPLES 3 and COMPARATIVE EXAMPLE 4

The polybutylene terephthalates obtained in Reference Example 1 and Example 1 were dried with hot air at 120° C. for 5 hours, and test samples were prepared under molding conditions including a cylinder temperature of 260° C., mold temperature of 60° C., injection pressure of 700 kg/cm$^2$, cooling time of 20 seconds and total cycle time of 35 seconds by setting a test sample mold to a 8.3 ounce injection molding machine. A tensile test and a low-temperature brittleness test were carried out in accordance with JIS K7216.

A hydrolysis promotion test was carried out and this test result was evaluated with a pressure cooker test at 122° C. and at a relative humidity of 100%.

The results are shown in Table 2.

TABLE 2

| | Tensile strength (MPa) Time (hr) | | | | | Brittleness at low temp- |
|---|---|---|---|---|---|---|
| | 0 | 20 | 30 | 40 | 50 | erature (°C.) |
| Example 3 | 49 | 52 | 54 | 54 | 56 | −40 |
| Comparative Example 4 | 47 | 52 | 50 | 30 | 5 | −25 | pressure until 90% of methyl ester groups was reacted. The thus obtained reaction product had an average polymerization degree of about 3. Thereafter, the reaction product was continuously supplied into a vertical polymerization reactor equipped with a stirrer to carry out a reaction at a stirring rate of 35 rpm, a temperature of 234° C. and a vacuum degree of 30 Torr. The resulting reaction product had an average polymerization degree of about 24.

(2) Subsequently, the thus obtained reaction product was continuously supplied into a horizontal monoaxial thin film polymerization reactor of a type in which the reaction product was scraped up by stirring vanes and dropped, and a reaction was carried out at a stirring rate of 5 rpm, a temperature of 240° C. and a vacuum degree of 0.6 Torr. The resulting polymer was taken out continuously from the polymerization reactor by a gear pump and formed into a chip. The results are shown in Table 3.

EXAMPLE 5

A reaction product similar to the reaction product obtained in (1) of Example 4 was continuously supplied into a horizontal biaxial screw type thin film polymerization reactor and a reaction was carried out at a stirring rate of 7 rpm, a temperature of 241° C. and a vacuum degree of 0.6 Torr. The resulting polymer was taken out continuously from the polymerization reactor by a gear pump and formed into a chip. The results are shown in Table 3.

TABLE 3

| | Prepolymer | | Crystallization conditions | | | Solid-phase polymerization conditions | | polymer obtained by solid-phase polymerization | | |
|---|---|---|---|---|---|---|---|---|---|---|
| | [η] (dl/g) | COOH (eq/10$^6$ g) | Agitation | Temp- erature (°C.) | Crystal- linity (%) | Temp- erature (°C.) | Time (hr) | [η] (dl/g) | σ of [η] | COOH (eq/10$^6$ g) |
| Example 4 | 0.73 | 19 | Done | 186 | 48 | 189 | 10.3 | 1.05 | 0.01 | 8 |
| Example 5 | 0.65 | 17 | Done | 187 | 48.5 | 192 | 15.2 | 1.16 | 0.01 | 6 |

According to the results of Table 2, as shown in Example 3, it was observed that PBT having a low equivalent weight of a terminal carboxyl group, provided by the present invention, had a remarkable effect of improving resistance to hydrolysis, shows a low brittleness temperature of −40° C. as well as an remarkable effect of improving toughness at low temperatures.

EXAMPLE 4

(1) 3,500 parts of dimethyl terephthalate, 2,560 parts of 1,4-butanediol and 26 parts of tetrabutoxide titanate were continuously supplied into a reactor equipped with a rectification column every hour and an ester exchange reaction was carried out at a temperature of 175° C. and at normal

What is claimed is:

1. A polybutylene terephthalate having a terminal carboxyl group concentration of 10 eq./10$^6$ g·polymer or less and an intrinsic viscosity [η], measured at 25° C. in orthochlorophenol, of 0.9 to 1.4 dl/g.

2. A polybutylene terephthalate according to claim 1 which contains an ionic alkali metal or a nitrogen atom in an amount of 0 to 5,000 ppm.

3. A polybutylene terephthalate according to claim 1 which is obtained by a solid-phase polymerization.

4. A polybutylene terephthalate according to claim 1 which exhibits a tensile strength of at least 40 MPa after 60 hours of a treatment at 122° C. in a 100% relative humidity atmosphere as an ASTM No.1 test sample.

5. A polybutylene terephthalate according to claim 1 which exhibits a low brittleness temperature lower than 30° C. in a low-temperature brittleness test based on JIS K7216.

6. A loose tube for an optical fiber comprising a polybutylene terephthalate which has a terminal carboxyl group concentration of 10 eq./$10^6$ g·polymer or less and an intrinsic viscosity [η], measured at 25° C. in orthochlorophenol, of 0.9 to 1.4 dl/g.

7. A loose tube according to claim 6, wherein the polybutylene terephthalate contains an ionic alkali metal or a nitrogen atom in an amount of 0 to 5,000 ppm.

8. A loose tube according to claim 6, wherein the polybutylene terephthalate is obtained by a solid-phase polymerization.

9. A loose tube according to claim 6, wherein the polybutylene terephthalate exhibits a tensile strength of at least 40 MPa after 60 hours of a treatment at 122° C. in a 100% relative humidity atmosphere as an ASTM No.1 test sample.

10. A loose tube according to claim 6, wherein the polybutylene terephthalate exhibits a low brittleness temperature lower than −30° C. in a low-temperature brittleness test based on JIS K7216.

* * * * *